United States Patent [19]
Posey

[11] Patent Number: 4,924,655
[45] Date of Patent: May 15, 1990

[54] FILM GUIDE SYSTEM

[75] Inventor: John L. Posey, McHenry, Ill.

[73] Assignee: Baxter Travenol Laboratories, Inc., Deerfield, Ill.

[21] Appl. No.: 67,346

[22] Filed: Jun. 29, 1987

[51] Int. Cl.$^5$ .......................... B65B 9/08; B65B 6/00
[52] U.S. Cl. ...................................... 53/128; 53/551; 493/213; 493/929; 156/514
[58] Field of Search ................. 53/128, 133, 410, 412, 53/450, 551; 156/514; 493/213, 923, 929

[56] References Cited

U.S. PATENT DOCUMENTS

| | | |
|---|---|---|
| 3,335,540 | 8/1967 | Reil . |
| 3,470,672 | 10/1969 | Tuma . |
| 3,681,892 | 8/1972 | Safranski .......................... 53/551 X |
| 3,886,714 | 6/1975 | de la Poype . |
| 3,894,381 | 7/1975 | Christine .......................... 53/410 X |
| 3,975,888 | 8/1976 | Jones . |
| 4,043,098 | 8/1977 | Putnam, Jr. . |
| 4,055,032 | 10/1977 | Hammond ........................ 53/451 X |
| 4,103,473 | 8/1978 | Bast . |
| 4,533,425 | 8/1985 | Wehle ............................... 53/128 X |
| 4,589,247 | 5/1986 | Tsuruta ............................ 53/551 X |
| 4,695,337 | 9/1987 | Christine ........................... 53/410 X |
| 4,697,403 | 10/1987 | Simpson ............................... 53/551 |
| 4,709,528 | 12/1987 | Merkus ................................. 53/128 |

FOREIGN PATENT DOCUMENTS

| | | | |
|---|---|---|---|
| 786406 | 10/1967 | Canada ............................. 493/213 |
| 476206 | 7/1975 | U.S.S.R. .............................. 53/551 |

Primary Examiner—John Sipos
Attorney, Agent, or Firm—Paul C. Flattery; John P. Kirby, Jr.; Robert M. Barrett

[57] ABSTRACT

A guide system for improving the orientation of a web of film as it passes around a fill tube structure in a form, fill, seal packaging machine is provided. The guide system comprises at least two members removably coupled to the fill tube structure, and so constructed and arranged that they increase the cross-sectional perimeter of the fill tube structure when they are secured thereto. The members cooperating with the fill tube structure to stretch the web of film as it passes around the fill tube structure. An improved apparatus for attaching fitments to a web of film and method is also provided.

23 Claims, 4 Drawing Sheets

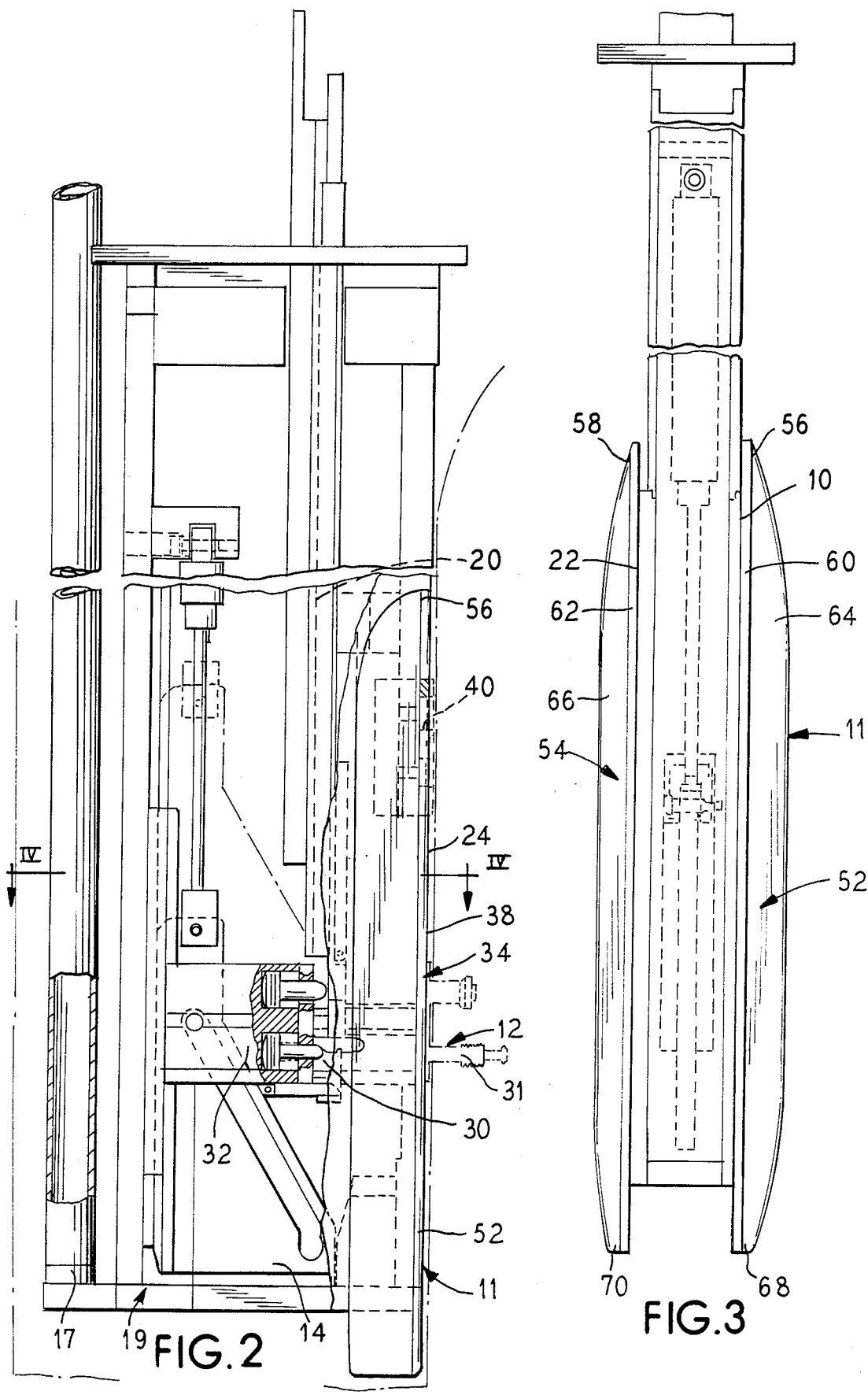

FILM GUIDE SYSTEM

The present invention relates generally to packaging machines. More specifically, this invention relates to form, fill, seal packaging machines and the like in which a fitment is secured to a web of film.

In some types of packaging art, including, inter alia, pharmaceutical, food, and dairy products, it is desirable to produce flexible containers that include means for accessing the container (hereinafter "fitments"). As used herein, the term "fitments" includes, without limitation, valves, ports, port and closure assemblies, and other means for accessing a container. Fitments provide a means for establishing fluid communication between the container and the outside environment. An example of a container utilizing a fitment is the VIAFLEX® flexible container for parenteral solutions produced by Travenol Laboratories, Inc., Deerfield, Ill.

Flexible containers with fitments can be produced via form, fill, seal packaging machines. Form, fill, seal packaging machines provide an apparatus for forming a web of film into a flexible container housing a desired product. Typically, these machines include a former or mandrel, a fill tube, and sealing stations. The former or mandrel forms or folds the web of film into a tubular shape around a fill tube. At a first sealing station, the fin, or top seal, is created. At a second sealing station, the side seals are created. The fill tube is utilized to dispense material to be packaged into the tubular web of film after a first side seal has been created. After the film is filled with the product, a second side seal is created and the sealed package is severed from the web of film.

It is also known, in form, fill, seal packaging machines to attach fitments to the web of film. Fitments can be secured to the web of film in at least two manners. First, the fitment can be fed and oriented from within the tubular-shaped film and sealed to the film by a sealer located outside the tubular-shaped web of film. Secondly, the fitment can be fed and oriented from outside the tubular-shaped web of film and sealed to the film by a sealer located within the tubular-shaped film.

An example of an apparatus that feeds and orients the fitments from within the tubular-shaped web of film is U.S. patent application Ser. No. 023,187, now U.S. Pat. No. 4,779,397 filed in the name of William Christine et al. In this form, fill, seal packaging machine, the apparatus for attaching fitments to a web of film includes, preferably, a fitment attachment tube, around which at least a portion of the web of film is passed. A film puncher and remover, for punching at least one hole in the web of film and removing the resultant slug, is located on an outside of the tubular-shaped film diametric a portion of the fitment attachment tube. Therefore, the web of film passes between the fitment attachment tube and the film puncher and remover.

A fitment feed member for feeding a fitment from a first position to a fitment pick-up position inside the fitment attachment tube is provided. The fitment attachment tube also includes a shuttle for moving the fitment from the fitment pick-up position to a fitment attachment position. The fitment attachment position is located so that when the fitment is in the attachment position, a portion of the fitment is received within the punched hole in the web of film. A sealer for welding the film to the fitment after it is received within the punched hole is provided on the outside of the tubular-shaped film.

It is also known, as disclosed in U.S. patent application Ser. No. 697,534, now U.S. Pat. No. 4,695,337 filed in the name of William Christine, to feed and orient the fitment from outside the tubular-shaped web of film and seal the fitment to the film utilizing a heat seal pin located within the tubular-shaped web of film. To this end, a heat seal pin is secured to the fill tube, and accordingly is located within the tubular-shaped film. A fitment press head is located diametric the heat seal pin on the outside of the tubular-shaped film. To secure the fitment to the web of film, the fitment press head urges the fitment against the web of film causing the heat seal pin to seal the film to the fitment.

When a flexible container having a fitment is created, it is important, in certain applications, that the fitment is secured at the bottom center of the web of film If the fitment is secured at a position off center, not only is a less aesthetically pleasing bag produced, but, the drainage characteristics of the fluid from the bag are not optimum. It is therefore important that when the fitment is secured to the film that it is secured at a position that is in the center of the width of the web of film.

Moreover, it is important that the area of the web of film to which the fitment is welded is sufficiently taut at the time of sealing so that it does not contain any wrinkles or creases. If the fitment is welded over a wrinkle or crease, a less secure seal between the web of film and the fitment is created.

Furthermore, if the web of film is to be punched, it is desirable for the web of film to be stretched during the punching function so that circular holes are produced in the web of film instead of eliptical ones.

These concerns, however, must be tempered against the concern of reducing the drag on the web of film as it flows through the form, fill, seal packaging machine. Furthermore, it is also desirable that the fill tube structure, i.e., the fill tube and fitment attachment tube, not have a cross-sectional size greater than the opening (throat) in the former. It may be necessary to remove the fill tube structure in order to repair or clean the structure. Due to the construction of typical form, fill, seal packaging machine, it is usually necessary to remove this structure by passing it out through the throat of the former.

Accordingly, there is need for a guide system for guiding a web of film through a fitment attachment station in a packaging machine. Likewise, there is a need for an improved fitment attachment station for attaching fitments to a web of film in a packaging machine.

The present invention provides a guide system for improving the orientation of a web of film as it passes around a fill tube structure in a form, fill, seal packaging machine. The guide system comprises means removably coupled to the fill tube structure for increasing the cross-sectional perimeter of the fill tube structure when the means is secured thereto. The means cooperates with the fill tube structure to stretch the web of film as it passes around the fill tube structure.

In an embodiment, the means comprises two angular members each having a base and a leg extending outwardly from the base. Preferably, a first and second end of the angular members are sloped to reduce any drag on the web of film caused by the guide system. Depending upon requirements, the width of legs does not have to be identical.

In another embodiment of the invention, the removable means comprises two plate members having a sufficient width and depth so that they cooperate with the fill tube structure to stretch the web of film as it passes around the fill tube structure.

The present invention also provides an improved apparatus for attaching fitments to a web of film in a form, fill, seal packaging machine. The apparatus for attaching fitments is located in proximity to an apparatus for creating a fin seal.

In an embodiment of the invention, the apparatus for attaching fitments comprises a fill tube structure including a fill tube and fitment attachment tube, the fitment attachment tube having located therein means for feeding a fitment to a fitment pickup position within the fitment attachment tube, and means for moving the fitment from the fitment pickup position to a fitment attachment position. The apparatus for attaching fitments also includes a guide system. The guide system is removably secured to the fill tube structure and includes at least two angular members each of the angular members having a base and a leg extending from the base. The fill tube structure, guide system, and apparatus for creating the fin seal cooperate to put the film under tension and in a taut condition during a fitment attachment operation.

In another embodiment of the invention, the apparatus for attaching fitments comprises a fill tube structure including a fill tube and fitment attachment means for melting a portion of the web of film to a fitment. The apparatus further includes a guide system removably secured to the fill tube structure, that includes at least two plate members. Each of the plate members has a sufficient width and depth to cause the plate members to increase the cross-sectional perimeter of the fill tube structure when they are secured thereto. The fill tube structure, guide system, and apparatus for creating the fin seal cooperate to put the film under tension and in a taut condition during a fitment attachment operation.

Preferably, in both embodiments, the fill tube structure, guide system, and fin seal station cooperate so that when the film is in the taut condition its inner cross-sectional perimeter is equal to or slightly greater than the inner perimeter length of a resultant bag created by the packaging machine.

An improved method for attaching fitments to a web of film is also provided. The method comprises the steps of: passing a web of film over a former to create a tubular shape; passing the tubular-shaped film around a fill tube structure; creating a fin seal in the web of film while simultaneously putting the film in a taut condition; and securing a fitment to the taut web of film.

Accordingly, the present invention provides a system for guiding the film through the fitment attaching station of a form, fill, seal packaging machine.

Moreover, the present invention provides an improved fitment attachment station for a form, fill, seal packaging machine.

Furthermore, the present invention provides a system for insuring that the film is taut at a position where the fitment is welded to the film.

A further advantage of the present invention is to provide a guide system for guiding the film through the fitment attachment station that does not unduly increase the drag on the film as it is fed through the packaging machine.

Another advantage of the present invention is to provide means for insuring that the fitments are secured to the center of the web of film so that packages created in the packaging machine have a fitment that is attached to the bottom center of the package.

Moreover, an advantage of the present invention is that it has a higher reliability than other guide systems because there are no moving parts.

Additionally, an advantage of the present invention is that it provides stable tracking of the web of film along the fill tube during processing in the packaging machine.

Furthermore, an advantage of the present invention is that it provides means for maintaining registration and centering of holes that are punched in the web of film at the fitment insertion station.

Still another advantage of the present invention is that it provides a guide system that can be adjusted to insure that the center of the width of the web of film is opposite the fin seal in the web of film.

A further advantage of the present invention is that in form, fill, seal packaging machines wherein holes are punched in the web of film, the present invention stretches the web of film at the punch station so that circular holes are created in the web of film as opposed to eliptical ones.

Another advantage of the present invention is that it provides a guide system that can be used either in an aseptic or nonaseptic form, fill, seal packaging machine.

Moreover, an advantage of the present invention is that the guide system is removable so that the fill tube structure can be removed through the throat of the former.

Still an advantage of the present invention is that it provides an improved fitment attaching apparatus that allows a fitment to be sealed to the film from within the tubular-shaped web of film.

Furthermore, an advantage of the present invention is that it provides an improved fitment attaching apparatus that allows a fitment to be sealed to the film from outside the tubular-shaped web of film.

Additional features and advantages are described in, and will be apparent from, the detailed description of the presently preferred embodiments and from the drawings.

FIG. 2 illustrates a side elevational view of the embodiment of the present invention illustrated in FIG. 1.

FIG. 3 illustrates a back elevational view of the embodiment of the present invention illustrated in FIG. 2.

Figure 1:
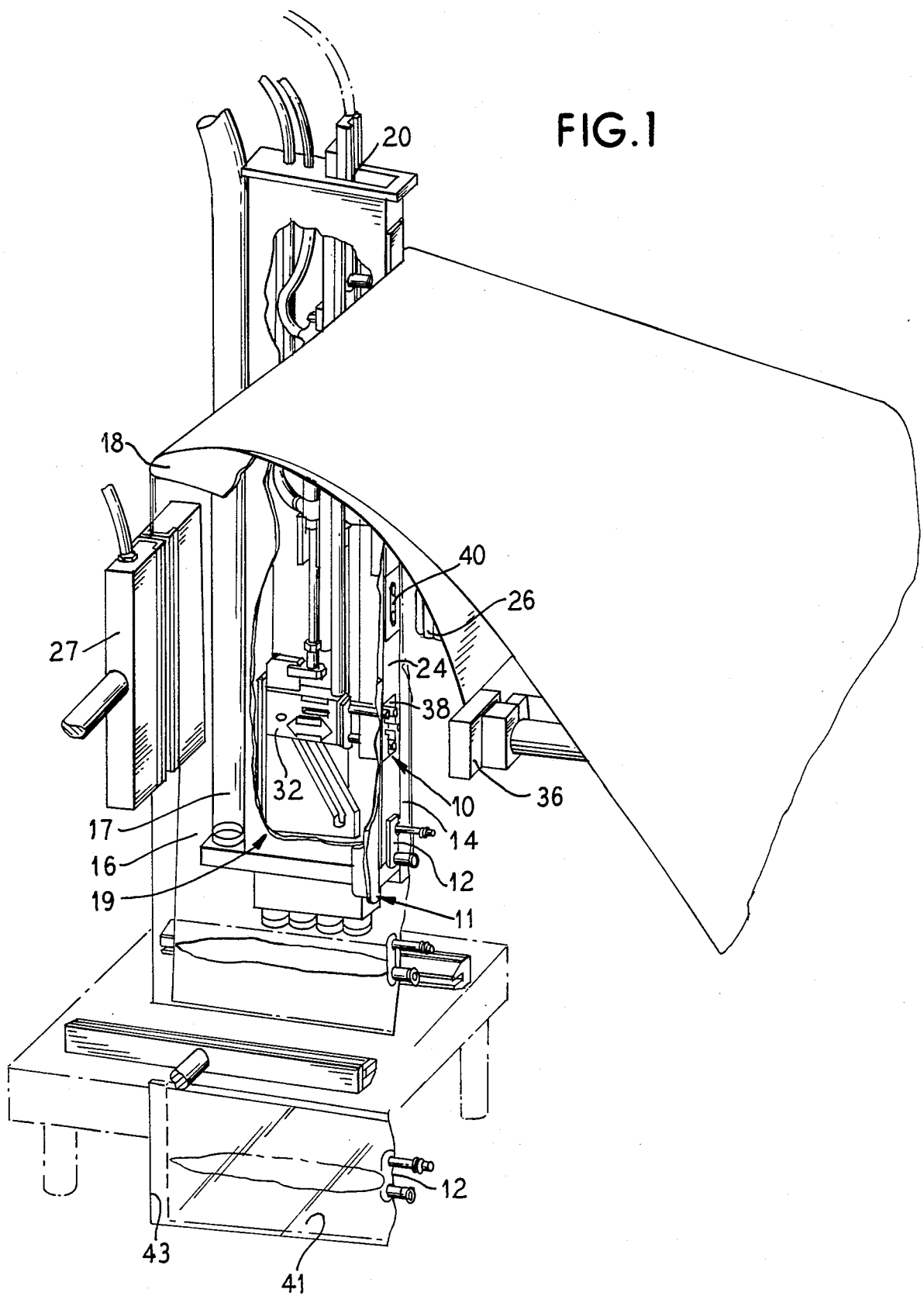
FIG. 1 illustrates a perspective view, with parts broken away, of an embodiment of the present invention in a form, fill, seal packaging machine.

The present invention provides a guide system for guiding a web of film through the fitment attachment station in a form, fill, seal packaging machine that creates flexible containers having attached fitments from a web of film. Moreover, the present invention provides an improved apparatus and method for attaching fitments to a web of film. The guide system insures that the film is in a taut condition, properly centered, at the fitment attachment station so that the fitments are properly secured to the film. To this end, the guide system helps to ensure that a strong seal is created between the film and fitment and that the resultant bag has a fitment that extends from its bottom center.

As used herein, the term "form, fill, seal packaging machine" means a packaging machine for creating from a web of film, a flexible container filled with a product. In a typical form, fill, seal packaging machine, the web of film is folded along abutting longitudinal edges and sealed onto itself (this is the fin seal). The film is then filled with a product and side seals are created. Of course, the guide system of the present invention can be used in other packaging machines or with other apparatus to guide a web of film.

Referring to FIGS. 1-4, an embodiment of the guide system 11 and fitment attaching apparatus 10 of the present invention is illustrated. In the embodiment illustrated, the fitment attaching apparatus 10 is constructed so that fitments 12 are fed and positioned by a fitment attachment tube 14 located inside a tubular-shaped web of film 16. The web of film 16 is formed into a tubular shape by a former 18.

The fitment attachment tube 14 and fill tube 17 define the fill tube structure 19 that is located within the throat of the former 18. The fitment attachment tube 14 has a substantially rectangular shape having a first side 20, a second side 22, and a front face 24. Preferably, the fitment attachment tube 22, except for the guide system 11 discussed below, is substantially similar to that described in U.S. patent application Ser. No. 023,187, filed in the name of William Christine et al.

The web of film 16 is passed over the former 18 that shapes the web of film 16 into a tubular or tear drop shape (hereinafter "tubular shape") and around the fill tube structure 19. Accordingly, the fitment attachment tube 14 is located on a first side of the web of film 16. A film puncher and remover 26 for punching at least one hole in the web of film 16 and removing the resultant slug is located on a second side of the web of film 16 outside the tubular-shaped film. Therefore, the web of film 16 passes between the fitment attachment tube 14 and the film puncher and remover 26.

As the film is passed around the fill tube structure 19, it is sealed at the fin seal station 27. The fin seal station 27 creates the fin seals 43 for the resultant bag 41. The fin seal station 27 can comprise any apparatus known in the art for creating fin seals in a web of film in a packaging machine.

Located within the fitment attachment tube 14 is a fitment feed track 20 for feeding the fitment 12 from a first position to a fitment pick-up position 30 within the fitment attachment tube. The fitment attachment tube 14 includes a shuttle 32 for moving the fitment from the fitment pick-up position 30 to a fitment attachment position 34. The fitment attachment position 34 is located so that a portion 31 of the fitment 12 is received within a punched hole in the web of film 16 when the fitment 12 is in the fitment attachment position. Also located on a second side of the web of film 16, outside the tubular-shaped web of film, is a heat sealer 36 for welding the film to the fitment 12 that has been so received within the punched hole.

The fitment attachment tube 14 includes a front face 24 that is closed except for a slot 38. The slot 38 is dimensioned to allow the fitments 12 to exit the fitment attachment tube 14 and be sealed to the web of film 16 when the fitments are in the fitment attachment position 34. Moreover, the front face 24 includes a spring cushion die plate 40 that functions, in part, to act as a back-up member so that the web of film 16 can be punched. To this end, the spring cushion die plate 40 cooperates the film puncher and remover 26. The film puncher and remover 26 includes cutting elements (not shown) that extend outwardly from the film puncher and remover 26 and cut the web of film 16 by being biased against the spring cushion die plate 40.

After the holes are punched in the web of film 16, in the next stroke of the machine, the web of film 16 is advanced so that the holes are now aligned with the slot 38 in the face 24 of the fitment attachment tube 14. The shuttle 32 moves the fitments 12 from within the inside of the elongated tube 14 through the slot 38 so that the elongated portions 31 of the fitment 12 pass through the holes punched in the web of film 16; this is the fitment attachment position 34. The heat sealer 36 then seals the web of film 16 to the fitment 12.

Due to the punching and sealing operations involved, it is desirable for the web of film 16 to be stretched taut across the punching and sealing areas. If the web of film 16 is sufficiently stretched, this will insure that the resultant bag 41 will have a fitment 12 extending directly below the fin seal 43, i.e., from the bottom center of the bag. Moreover, if the web of film 16 is sufficiently stretched, the fitment 12 will not be secured over a wrinkled or creased portion of the film 16 causing a weaker seal. To this end, the guide system 11 and fitment attachment apparatus 10 insure that the web of film 16 is taut over the punch and seal areas.

Figure 4:
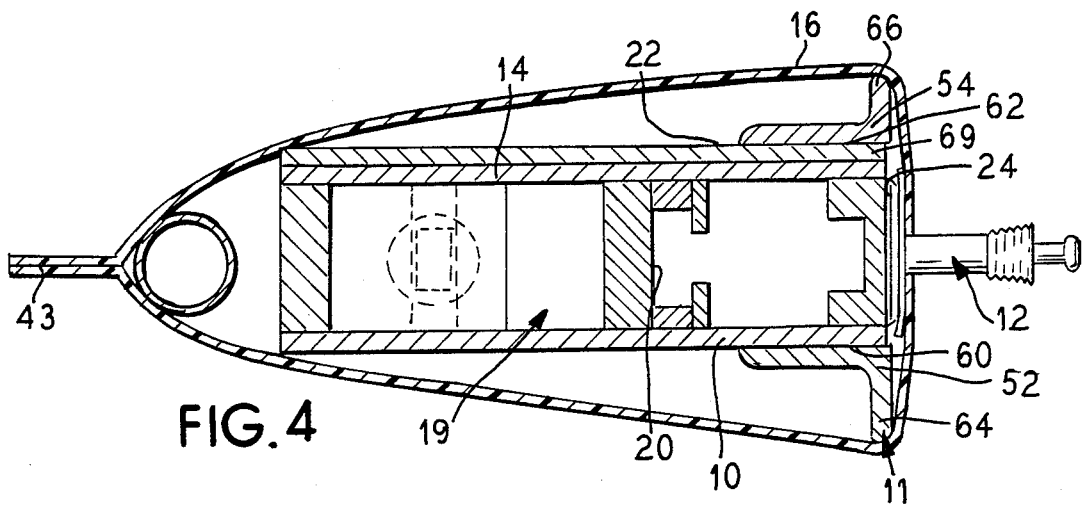
FIG. 4 illustrates a cross-sectional view taken along lines IV—IV of FIG. 2.

Referring now to FIGS. 2-4, the guide system 11, as illustrated, comprises two angular members 52 and 54 that have a length that is preferably less than the length of the fitment attachment tube 14. The angular members 52 and 54 include at a first end 56 and 58, respectively, a sloped surface that is gradually sloped to insure that the film 16 does not drag or is not scratched as it is guided by the guide system 11.

The angular members 52 and 54 also include a base member 60 and 62, respectively, that is secured to a side 20 and 22, respectively of the fitment attachment tube 14. The base member 60 and 62 can be secured to the fitment attachment tube 14 by machine screws or other means.

Extending from the base member 60 and 62 are legs 64 and 66, respectively. As illustrated, the legs 64 and 66 of the angular members 52 and 54 need not be identical, but rather, can have varying widths to compensate for variances in the construction of the fitment attachment tube 14. For example, as illustrated in FIG. 4, a first side 20 of the fitment attachment tube 14 includes an extra plate member 69 that skews the center of the fitment attachment tube 14 so that the center of the fitment attachment tube 14 is not directly in line with the fin seal 43 that is created in the web of film 16 at the fin seal station 27. Accordingly, if the width of the leg 64 of the first angular member 52 was the same as that of the leg 66 of the second angular member 54, the film 16 would not be properly centered on the fitment attachment tube 14 with respect to the fin seal station 27 and therefore the fitment 12 would not be attached to the center width of the web of film 16.

As previously stated, the angular members 52 and 54 have a gradual slope at a first end 56 and 58 thereof. The width, however, of the angular members 52 and 54, due to the legs 64 and 66, increases to a size so that the inner perimeter of the web of film 16, when it is stretched around the guide system 11 and sealed at the fin seal station 27, is equal to or slightly greater than the inner perimeter length of the resultant bag 41. This construction insures that the web of film 16 is taut across the sealing and punching areas of the fitment attachment tube 14. Accordingly, the guide system 11 cooperates with the fitment attachment tube 14 and fin seal station 27 to approximate the final inner cross-sectional perimeter of the resultant bag 41 created in the packaging machine 10. This insures that the fin seal 43 and fitment 12 are aligned in the resultant bag 41. Therefore, when the fitment 12 is secured to the web of film 16, the fitment 12 will be opposite the fin seal 43.

As illustrated in FIG. 3, preferably, the angular members 52 and 54 are also sloped at a second end 68 and 70, respectively, that is opposite the first end 56 and 58. This also ensures that the guide system 11 does not unnecessarily cause drag on the web of film 16 as it is fed through the packaging machine as well as reduces any risk of the guide system 11 damaging the web of film.

If desirable, the angular members 52 and 54 can include means for adjusting the width of the legs 64 and 66. Accordingly, depending on requirements and modifications made to the packaging machine 10, the legs 64 and 66 can be adjusted to account for any variations desired. For example, if a bag having a greater length is desired, the angular members 52 and 54 can be adjusted to have wider legs 64 and 66.

The angular members 52 and 54 can be constructed from any material known in the art, such as plastic, stainless steel, or aluminum. The angular members 52 and 54 should be constructed in view of the particulate requirements. Preferably, the angular members 52 and 54 are coated with a coating that provides a surface having a low coefficient of friction. Preferably, the angular members 52 and 54 are coated with a teflon coating.

Figure 7:
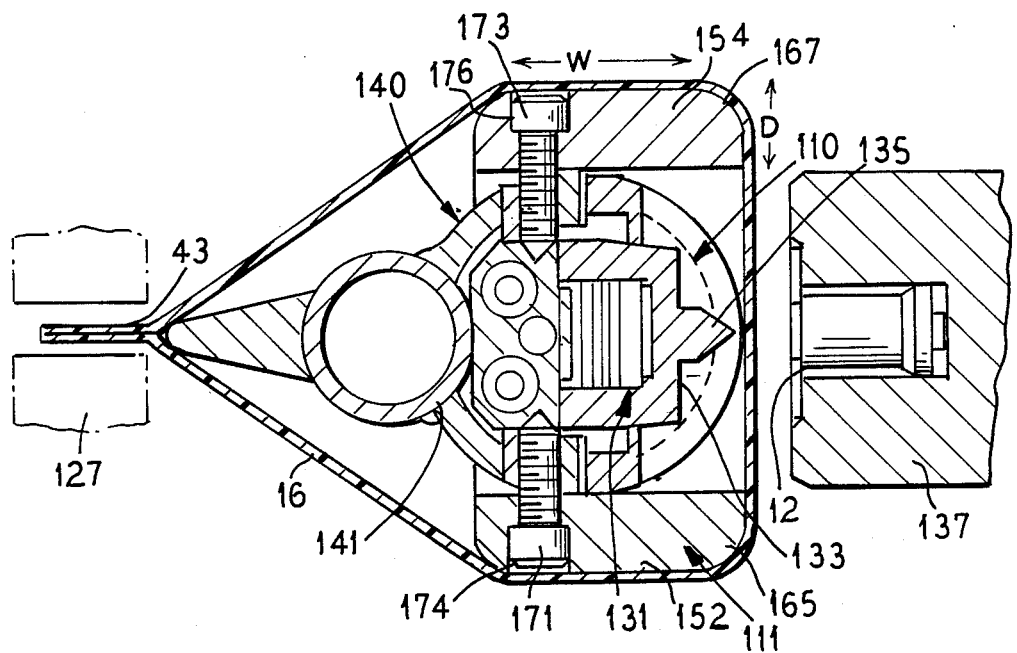
FIG. 7 illustrates a cross-sectional view of the apparatus of FIG. 5 taken along lines VII—VII of FIG. 5.
Figure 6:
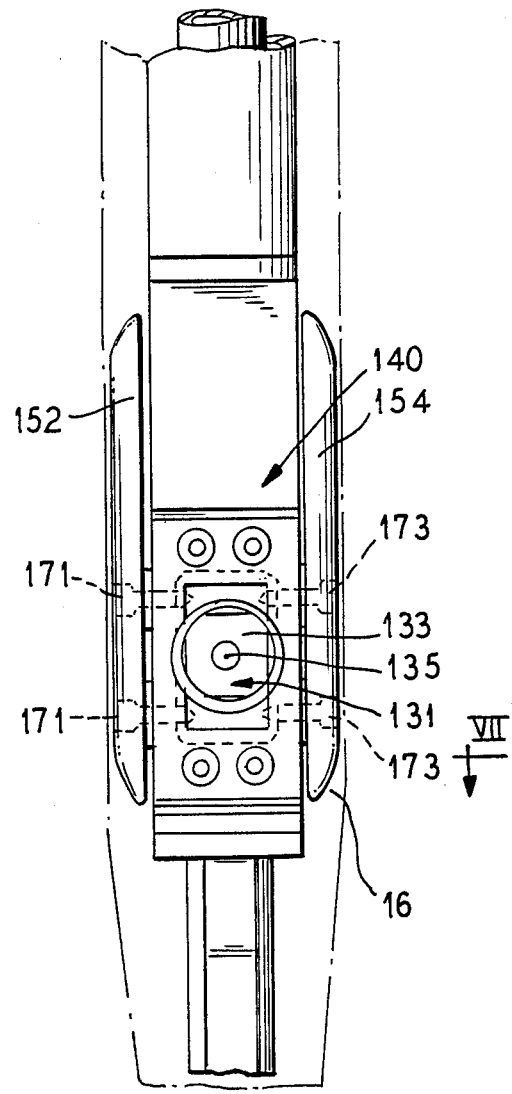
FIG. 6 illustrates a frontal side elevational view of the embodiment of the present invention illustrated in FIG. 5.
Figure 5:
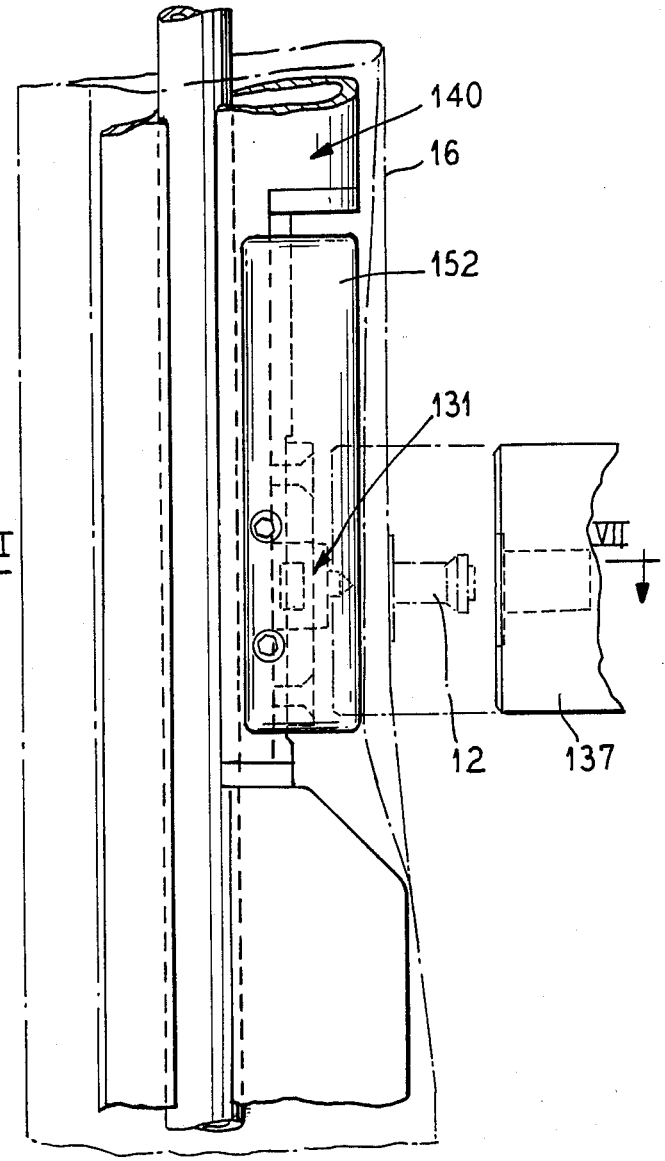
FIG. 5 illustrates a side elevational view of another embodiment of the present invention.

Referring now to FIGS. 5-7, another embodiment of the guide system 111 and fitment attachment apparatus 110 is illustrated. As illustrated, the guide system 111 and fitment attachment apparatus 110 cooperate to secure a fitment 12 to a web of film 16, the fitment being fed and oriented on an outside of the tubular-shaped web of film 16.

To this end, located on an inside of the tubular-shaped film is a heat sealer 131. The heat sealer 131 includes an abutment face 133 from which extends a heat seal pin 135. Located on a second side of the web of film 16, or outside the tubular-shaped web of film 16, is a fitment press head 137. The fitment press head 137 is located diametric the heat sealer 131 and urges a fitment 12 against the web of film 16 and thereby, against the heat seal pin 135 and abutment face 133. This results in the fitment 12 being sealed to the web of film 16.

The heat sealer 131 and fill tube 141 define the fill tube structure 140 of the form, fill, seal packaging machine 110. As discussed above, the web of film 16 is designed to pass around the fill tube structure 140. As illustrated, the fill tube structure 140 is indented at the fitment attachment station.

As the web of film 16 passes around the fill tube structure 140, it also passes the fin seal station 127. Again, the fin seal station functions to create a fin seal 43 in the web of film 16.

The heat sealer 131 and fitment press head 137 are substantially similar to that disclosed in U.S. patent application Ser. No. 697,534 filed in the name of William Christine. As discussed therein, this type of fitment attaching apparatus can be utilized in an aseptic packaging machine.

The guide system 111 includes plate members 152 and 154. The plate members 152 and 154 have a sufficient width "W" and depth "D" so that when they are secured to the fill tube structure 140 they increase the cross-sectional perimeter of the fill tube structure at the fitment attachment station. As illustrated, the plate members 152 and 154 can be secured to sides of the fill tube structure 140, to which the heat sealer 131 is secured, by machine screws 171 and 173 that are received within apertures 174 and 176 in the plate members. It should be noted, however, that other means for securing the angular members 152 and 154 to the fill tube structure 140 can be utilized.

As illustrated, preferably, the top side 165 and 167 of the plate members 152 and 154 are rounded. This reduces the drag on the web of film 16 as well as limits any possible damage to the web of film 16 from the guide system 111.

The plate members 152 and 154 have a sufficient width and depth so that the inner perimeter of the tubular-shaped web of film 16, when it is stretched around the guide system 111 and sealed at the fin seal station 127, is equal to or slightly greater than the inner perimeter of the resultant bag 41 created in the form, fill, seal packaging machine 110.

As in the embodiment previously described, the plate members 152 and 154 can be constructed from any material known in the art. If, however, the guide system 111 or apparatus for attaching fitments 210 is to be utilized in an aseptic system, the angular members 152 and 154 should be constructed from a material such as ultra-high molecular weight polyethylene.

It should be understood that various changes and modifications to the presently preferred embodiments described herein will be apparent to those skilled in the art. Such changes and modifications can be made without departing from the spirit and scope of the present invention and without diminishing its attendant advantages. It is therefore intended that such changes and modifications be covered by the appended claims.

I claim:

1. A guide system for improving the orientation of a web of film as it passes around a fill tube structure in a form, fill, seal packaging machine that includes a fitment attachment means in juxtaposition to a portion of the fill tube structure comprising:

means for placing at least a front surface of the web of film in a taut condition for at least a portion of the length of the fill tube structure it passes around, the means being removably coupled to at least one side of the fill tube structure and extending for at least a portion of its length along the side of the fill tube structure and place the web of film in a taut condition at the portion of the fill tube structure in juxtaposition to the fitment attachment means.

2. The guide system of claim 1 wherein the means includes two angular members removably coupled on opposite sides of the fill tube structure, each angular member having a base and a leg extending from the base.

3. The guide system of claim 2 wherein the legs are sloped at a first end thereof.

4. The guide system of claim 3 wherein the legs are sloped at a second end thereof.

5. The guide system of claim 2 wherein the legs of the angular members do not have identical widths.

6. The guide system of claim 1 wherein the means includes two plate members having a sufficient width and depth to increase the cross-sectional perimeter of the web of film.

7. A guide system for improving the orientation of a web of film as it passes around a fill tube structure in a form, fill, seal packaging machine having a fitment attaching apparatus for attaching a fitment to the web of film comprising:
at least two angular members removably coupled to opposite sides of the fill tube structure and extending for at least a portion of their length along the sides of the fill tube structure, the angular members each including a base, the angular members cooperating with the fill tube structure to stretch the web of film as it passes around a portion of the fill tube structure that is in juxtaposition to the fitment attaching apparatus.

8. The guide system of claim 7 wherein the legs are sloped at a first and second end thereof.

9. The guide system of claim 7 wherein the legs of the angular members do not have identical widths.

10. In a form, fill, seal packaging machine, an apparatus for attaching fitments to a web of film, the apparatus for attaching fitments being located in proximity to an apparatus for creating a fin seal, the apparatus comprising:
a fill tube structure including a fill tube and fitment attachment tube, the fitment attachment tube having located therein means for feeding a fitment to a fitment pickup position within the fitment attachment tube, and means for moving the fitment from the fitment pickup position to a fitment attachment position;
a guide system, the guide system being removably secured to the fill tube structure and including at least two angular members each of the angular members having a base and a leg extending from the base, the base of each angular member being removably secured on opposite sides of the fill tube structure and extending for at least a portion of its length along the side of the fill tube structure in a plane that is substantially parallel to a plane defined by the side of the fill tube structure when secured to the fill tube structure; and
the fill tube structure, guide system, and apparatus for creating the fin seal cooperate to put the film under tension and in a taut condition during a fitment attachment operation.

11. The apparatus of claim 10 wherein the angular members are sloped at a first end thereof.

12. The apparatus of claim 11 wherein the angular members are sloped at a second end thereof.

13. The apparatus of claim 10 wherein the angular members are secured to the fitment attachment tube of the fill tube structure.

14. The apparatus of claim 10 wherein the angular members have a length that is less than the length of the fitment attachment tube.

15. The apparatus of claim 10 wherein the fill tube structure, guide system, and apparatus for creating the fin seal are so arranged and constructed that when the film is in the taut condition its inner cross-sectional perimeter is equal to or slightly greater than the inner perimeter length of a resultant bag created in the form, fill, seal packaging machine from the web of film.

16. The apparatus of claim 10 wherein the legs of the angular members do not extend from their respective bases for the same distance.

17. In a form, fill, seal packaging machine, an apparatus for attaching fitments to a web of film, the apparatus for attaching fitments being located in proximity to an apparatus for creating a fin seal, the apparatus comprising:
a fill tube structure including a fill tube and fitment attachment means for melting a portion of the web of film to a fitment;
a guide system, the guide system being removably secured to the fill tube structure and including at least two plate members each of the plate members having a sufficient width and depth to cause the guide system to cause the web of film to be stretched at a fitment attachment station of the fill tube structure the plate members extending for a portion of their length along opposite sides of the fill tube structure when the plate members are removably secured thereto; and
the fill tube structure, guide system, and apparatus for creating the fin seal cooperate to put the film under tension and in a taut condition during a fitment attachment operation.

18. The apparatus of claim 17 wherein the plate members are rounded on a top side thereof.

19. The apparatus of claim 17 wherein the plate members include at least one aperture and the fill tube structure includes a corresponding aperture allowing a machine screw to removably secure the plate members to the fill tube structure.

20. The apparatus of claim 17 wherein the plate members have a length that is less than the length of the fill tube structure.

21. The apparatus of claim 17 wherein the fill tube structure, guide system, and apparatus for creating the fin seal are so arranged and constructed that when the film is taut its inner perimeter is equal to or slightly greater than the inner perimeter length of a resultant bag created in the form, fill, seal packaging machine from the web of film.

22. The apparatus of claim 17 wherein the plate members do not have identical widths.

23. The apparatus of claim 17 wherein the plate members do not have identical depths.

* * * * *